US007396135B2

(12) United States Patent
Hasegawa

(10) Patent No.: US 7,396,135 B2
(45) Date of Patent: Jul. 8, 2008

(54) DISPLAY APPARATUS AND IMAGE INFORMATION GENERATING METHOD ADAPTED TO DISPLAY APPARATUS

(75) Inventor: Hiroshi Hasegawa, Chino (JP)

(73) Assignee: Seiko Epson Corporation, Tokyo (JP)

( * ) Notice: Subject to any disclaimer, the term of this patent is extended or adjusted under 35 U.S.C. 154(b) by 332 days.

(21) Appl. No.: 11/198,241

(22) Filed: Aug. 8, 2005

(65) Prior Publication Data

US 2006/0033890 A1 Feb. 16, 2006

(30) Foreign Application Priority Data

Aug. 11, 2004 (JP) ............................ 2004-234126

(51) Int. Cl.
*G03B 21/26* (2006.01)

(52) U.S. Cl. ........................... 353/94; 353/69; 348/745

(58) Field of Classification Search .................. 353/70, 353/69, 94, 121; 348/778, 745, 744, 739
See application file for complete search history.

(56) References Cited

U.S. PATENT DOCUMENTS 6,222,593 B1 * 4/2001 Higurashi et al. ........... 348/745
6,811,264 B2 * 11/2004 Raskar et al. ................. 353/94
7,114,813 B2 * 10/2006 Wada et al. ................... 353/70
2001/0024231 A1 9/2001 Nakamura et al.

FOREIGN PATENT DOCUMENTS

JP A-09-326981 12/1997
JP A 2000-184317 6/2000
JP A-2001-339742 12/2001

* cited by examiner

*Primary Examiner*—Andrew T Sever
(74) *Attorney, Agent, or Firm*—Oliff & Berridge, PLC

(57) ABSTRACT

Aspects of the invention can provide a display apparatus that displays one image plane using plural projection type image display devices. The plural projection type image display devices that together form the display apparatus can be disposed in such a manner that at most one projection type image display device among the plural projection type image display devices forms a projection region of an original shape of projection on a screen.

8 Claims, 16 Drawing Sheets

SCR
VIEWER'S SEATS
PJ1
PJ2

PROJECTOR PJ1

| PROJECTOR COORDINATE | SCREEN COORDINATE | AREA | LUMINANCE VALUE |
|---|---|---|---|
| 0000,000 | xxx,xxx | 10 | 80 |
| 0001,000 | xxx,xxx | 10 | 80 |
| 0002,000 | xxx,xxx | 10 | 80 |
| ⋮ | ⋮ | ⋮ | ⋮ |

FIG.14A

PROJECTOR PJ2

| PROJECTOR COORDINATE | SCREEN COORDINATE | AREA | LUMINANCE VALUE |
|---|---|---|---|
| 0000,000 | xxx,xxx | 2 | 320 |
| 0001,000 | xxx,xxx | 2 | 320 |
| 0002,000 | xxx,xxx | 2 | 320 |
| ⋮ | ⋮ | ⋮ | ⋮ |

FIG.14B

SCREEN SCR

| SCREEN COORDINATE | PROJECTOR COORDINATE | AREA | LUMINANCE VALUE | PJ |
|---|---|---|---|---|
| xxx,xxx | 0000,000 | 10 | 80 | PJ1 |
| xxx,xxx | 0000,000 | 2 | 320 | PJ2 |
| xxx,xxx | 0001,000 | 10 | 80 | PJ1 |
| xxx,xxx | 0001,000 | 2 | 320 | PJ2 |
| ⋮ | ⋮ | ⋮ | ⋮ | ⋮ |

FIG.14C

ENLARGED VIEW IN THE VICINITY OF SCREEN COORDINATE Ps

PROJECTED PIXEL OF PROJECTOR PJ1

PROJECTED PIXEL OF PROJECTOR PJ2

DISPLAY APPARATUS AND IMAGE INFORMATION GENERATING METHOD ADAPTED TO DISPLAY APPARATUS

BACKGROUND

Aspects of the present invention can relate to a display apparatus that generates a high-luminance and high-resolution image using plural projection type image display devices, and to an image information generating method adapted to the display apparatus. Related art projection type image display devices, such as a projector, have been receiving attention in recent years. The projection type image display device can be characterized by its high degree of freedom in display, such as a large display screen, the brightness of the display screen, and the ability to display an image on a curved surface. For example, it is possible to use plural projection type image display devices, so that projected images from the respective projection type image display devices are superimposed on a screen. This consequently enables a high-definition image to be formed on a larger screen.

Related art techniques to superimpose images on the screen using plural projection type image display devices are roughly divided into three types: "tiling projection", "stack projection", and the combination of these two types. The tiling projection can be chiefly characterized by the capability of generating an image on a screen can be luminance and resolution that become larger and higher in roughly proportion to the number of projection type image display devices used. The tiling projection, however, has problems as follows. That is, the image quality is deteriorated because joined portions are noticeable, colors become irregular due to individual differences of the projection type image display devices used, and further, it is difficult to display images at high definition while maintaining time synchronization.

Meanwhile, the stack projection can be chiefly characterized by its capability of generating a high-luminance image. The stack projection, however, also has problems as follows. That is, it is difficult to generate a high-resolution image, and precise position control is required. In addition, as with the tiling projection, it is difficult to display images at high definition while maintaining time synchronization.

The combination of the tiling projection and the stack projection has the characteristics and problems as described above. Although the combination of the tiling projection and the stack projection is not used as often as the tiling projection or stack projection alone, one example is disclosed, for example, in JP-A-2000-184317.

FIG. 20 is a view schematically showing the configuration of the example disclosed in the cited document. The example can include plural high-luminance and high-resolution projection type image display devices PJa, PJb, and PJc each covering an assigned projection region and a low-luminance and low-resolution projection type display device PJd covering the entire screen as a projection region.

Incidentally, projection regions formed on the screen by the individual projection type image display devices are essentially of a rectangular shape in any of the tiling projection, the stack projection, and the combination of the two types. This is because most of normally used projection type image display devices have rectangular projection regions.

When one image plane is formed using a combination of the projection type image display devices each having a rectangular projection region, it is preferable that the projection region formed by the projection type image display device is projected in a rectangular shape, which is the original shape of the projection region of the projection type image display device, or in a shape closer to the original shape.

Hence, in the projection mode in the related art using any of the tiling projection, the stack projection, and the combination of the two types, it is normal that a projection region from each of the projection type image display devices forming the apparatus is of a rectangular shape. In the cited document, too, the projection regions formed on the screen by the respective projection type image display devices are of a rectangular shape.

By specifying the projection regions from the respective projection type image display devices to be of a rectangular shape, which is the original shape of the projection region of the individual projection type image display devices, it is possible to achieve an advantage that values allocated to individual pixels of the respective projection type image display devices can be readily computed. In exchange, however, there is a problem that moiré (interference fringes) occurs particularly in a superimposed portion.

When projection regions of an original rectangular shape are superimposed intact, because pixels aligned in the form of a tetragonal lattice have the same size and periodic arrangement, interferences of pixels with respect to one another that gives rise to moiré are thought to occur readily.

SUMMARY

Aspects of the invention can provide a display apparatus capable of enhancing the quality of projected images by making it difficult for moiré to occur in a superimposed portion when plural projection type image display devices are used to form one image plane by superimposing projected images from the respective projection type image display devices on the screen, and to provide an image information generating method adapted to the display apparatus.

A first aspect of the invention can provide a display apparatus that displays one image plane using plural projection type image display devices. The plural projection type image display devices that together form the display apparatus are disposed in such a manner that at most one projection type image display device among the plural projection type image display devices forms a projection region of an original shape of projection on a screen.

It is thus possible to vary the size and the periodic arrangement of pixels on the screen for each projection type image display device when so-called stack projection is performed by superimposing projection regions formed by the respective projection type image display devices on the screen. When configured in this manner, the pixels do not interfere with one another easily and the occurrence of moiré can be therefore suppressed, which can in turn enhance the quality of a projected image.

It is preferable that the original shape of projection of each projection type image display device is a rectangular shape, and that the plural projection type image display devices can be disposed in such a manner that at most one projection type image display device forms a projection region of a rectangular shape.

By intentionally deforming the original rectangular projection shape to a shape different from a rectangular shape in this manner, it is possible to vary the size and the periodic arrangement of pixels on the screen for each projection type image display when the stack projection is performed as described above. When configured in this manner, the pixels do not interfere with one another easily, which can in turn suppress the occurrence of moiré.

It is also preferable that the plural projection type image display devices are disposed with respect to the screen in such a manner that a ratio between a maximum value and a minimum value of the luminance on the screen of a projected image from each projection type image display device is a specific value or larger.

By disposing the projection type image display devices in such a manner that a ratio between the maximum value and the minimum value of luminance on the screen in each projection type image display device is a specific value or larger as described above, it can be possible to achieve an advantage that the occurrence of moiré can be suppressed by making it difficult for pixels to interfere with one another. The maximum value and the minimum value of luminance on the screen referred to herein mean the maximum value and the minimum value of luminance obtained from the distribution of luminance when lights are projected onto the screen by setting all the pixels on the display device (for example, a liquid crystal panel) of each projection type image display device to output at the maximum luminance value.

It is preferable that the ratio between the maximum value and the minimum value of the luminance is such that a maximum value of luminance is nearly twice or larger a minimum value of luminance. When configured in this manner, it is possible to ensure the advantage that the occurrence of moiré is suppressed by making it difficult for pixels to interfere with one another.

It is preferable that the plural projection type image display devices are disposed in such a manner that a ratio between a maximum value and a minimum value of a projection area on the screen by pixels of each projection type image display device is a specific value or larger.

By disposing the projection type image display devices in such a manner that a ratio between the maximum value and the minimum value of the projection area on the screen by pixels of each projection type image display device is a specific value or larger, it is also possible to achieve the advantage that the occurrence of moiré is suppressed by making it difficult for pixels to interfere with one another.

It is preferable that a ratio between the maximum value and the minimum value of the projection area on the screen of the pixels of each projection type image display device is such that the maximum value of the projection area is nearly twice or larger the minimum value of the projection area. When configured in this manner, it is also possible to ensure the advantage that the occurrence of moiré is suppressed by making it difficult for pixels to interfere with one another.

A second aspect of the invention can provide a display apparatus that displays one image plane on a screen using at least first and second projection type image display devices. Herein, let P1 be a pixel of the first projection type image display device corresponding to a position at a particular screen coordinate Ps included in a superimposed region in which projection regions formed on the screen by the first and second projection type image display devices are superimposed, and let P2 be a pixel of the second projection type image display device corresponding to the position at the screen coordinate Ps. Then, each projection type image display device is disposed with respect to the screen in such a manner that a differential vector on the screen, $\Delta P1=(P1'-P1)$, between the pixel P1 of the first projection type image display device and at least one pixel P1' adjacent to the pixel P1 is different from a differential vector on the screen, $\Delta P2=(P2'-P2)$, between the pixel P2 of the second projection type image display device and a pixel P2' adjacent to the pixel P2.

The exemplary display apparatus according to the second aspect can achieve the same advantage as that of the display apparatus according to the first aspect. In the display apparatus according to the second aspect, the projection type image display devices can be disposed so that the occurrence of moiré can be suppressed regardless of the original shape of projection of the projection type image display devices. It is also preferable for the display apparatus according to the second aspect of the invention to have the characteristics of the display apparatus according to the first aspect as has been described above.

A third aspect of the invention can provide an image information generating method adapted to a display apparatus for generating image information given to respective projection type image display devices that together form the display apparatus that displays one image plane on the screen using plural projection type image display devices. The method can include generating plural sub-regions by dividing the screen; acquiring resolution of each projection type image display devices for each one of the sub-regions obtained by dividing the screen; and allocating a pixel value to a pixel of each projection type image display device corresponding to a sub-region of interest, first from a projection type image display device judged as having lowest resolution for the sub-region of interest.

When configured in this manner, it can be possible to give an optimum pixel value to each pixel of the respective projection type image display devices that together form the display apparatus when the display apparatus according to the first aspect is put into practical use.

It is preferable for the image information generating method according to the third aspect that when the pixel value is allocated, a given pixel value that is equal to or smaller than a pixel value of a pixel having a minimum pixel value among desired pixel values that should be displayed on the screen by pixels within the sub-region of interest is first given to each pixel corresponding to the sub-region of interest of the projection type image display device judged as having the lowest resolution for the sub-region of interest, and a difference between the pixel value given from the projection type image display device judged as having the lowest resolution and the desired pixel value is given to each pixel corresponding to the sub-region of interest of another projection type image display device.

When configured in this manner, in a case where the stack projection is performed using plural projection type image display devices, it is possible to give adequate pixel values to pixels in the superimposed portion formed by the respective projection type image display devices. A desired pixel value that should be displayed on the screen can be thus obtained.

It is also preferable for the image information generating method according to the third aspect that the pixel value is a luminance value. It is thus possible to give an adequate luminance value to each pixel of each projection type image display device.

A forth aspect of the invention can provide an image information generating method adapted to a display apparatus for generating image information given to respective projection type image display devices that together form a display apparatus that displays one image plane on the screen using plural projection type display devices. The method can include creating in advance a table from which an area that can be projected on a screen by a pixel and a pixel value that can be outputted from the pixel are acquired for each pixel of the respective projection type image display devices at each coordinate on the screen, and acquiring the pixel value of each pixel of each projection type image display device on the basis of image information to be displayed with reference to the table.

Because an adequate pixel value to be given to each pixel of the respective projection type image display devices can be obtained by referring to the table, once the table is created, it is possible to obtain an adequate pixel value quickly for each pixel in the superimposed portion formed by the respective projection type image display devices. The image information generating method according to the fourth aspect is therefore particularly suitable in a case where the stack projection is performed using a number of projection type image display devices.

It is preferable for the image information generating method adapted to the display apparatus according to the fourth aspect that when the pixel value of each pixel of each projection type image display device is acquired on the basis of the image information to be displayed with reference to the table, in a case where the pixel value of a given projection type image display device obtained from the table is insufficient for a desired pixel value, a sufficiently large pixel value for the desired pixel value is given to a projection type image display device provided with a pixel found from the table to be present close to the pixel and have a larger pixel value.

When configured in this manner, in a case where the stack projection is performed using plural projection type image display devices, it is possible to give adequate pixel values to pixels in the superimposed portion formed by the respective projection type image display devices. A desired pixel value that should be displayed on the screen can be thus obtained.

It is also preferable for the image information generating method adapted to the display apparatus according to the fourth aspect that the pixel value given to the projection type image display device provided with the pixel having the larger pixel value is a difference between the pixel value given from the projection type image display device that fails to acquire the pixel value that should be displayed and the desired pixel value.

This configuration enables the image information generating method adapted to the display apparatus according to the fourth aspect to be put into practice. It is also preferable for the image information generating method according to the fourth aspect that the pixel value is a luminance value.

BRIEF DESCRIPTION OF THE DRAWINGS

The invention will be described with reference to the accompanying drawings, wherein like numbers reference like elements, and wherein:

FIGS. 14A, 14B, and 14C are views showing the contents of tables used in a second image information generating method;

DETAILED DESCRIPTION OF PREFERRED EMBODIMENTS

Figure 1:
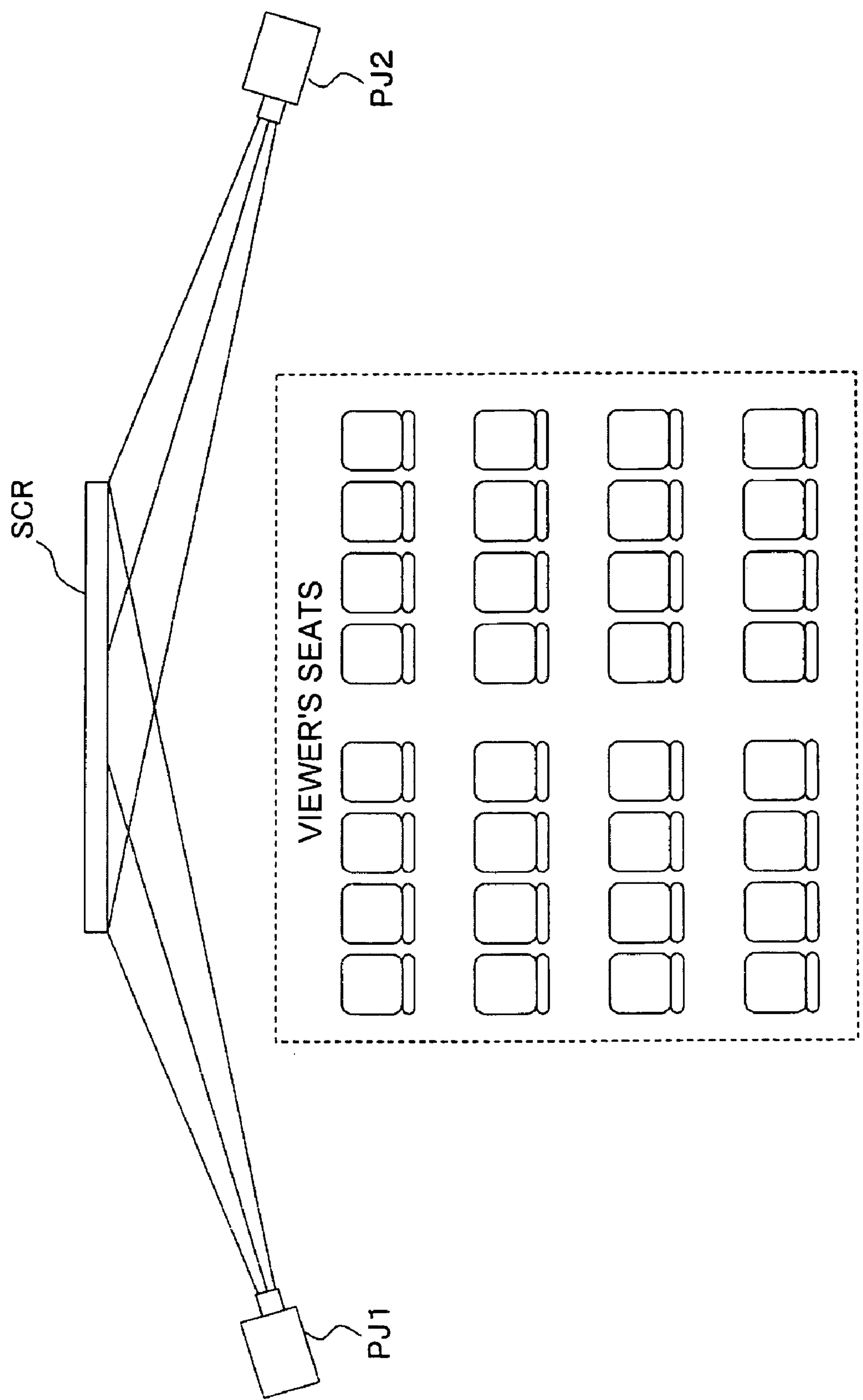
FIG. 1 is a view used to describe a display apparatus according to an exemplary embodiment of the invention.

Hereinafter, an exemplary embodiment of the invention will be described. Firstly, the concept of the invention will be described. FIG. 1 is a view used to describe a display apparatus according to an exemplary embodiment of the invention. The display apparatus comprises plural (two, in the example of FIG. 1) projection type image display devices PJ1 and PJ2 (hereinafter, referred to as projectors PJ1 and PJ2, respectively) that are disposed, respectively, on the left and right sides at specific angles with respect to a screen SCR.

Assume that the projectors PJ1 and PJ2 are typical projectors that form rectangular projection regions on the screen SCR when they project lights from positions at which they oppose the screen SCR straight, and that the rectangular projection regions are the original shape of the projection regions of the projectors PJ1 and PJ2. Herein, the shape of these rectangular projection regions is referred to as the original shape of projection. When lights are projected onto the screen SCR from the projectors PJ1 and PJ2 that have a rectangular shape as the original shape of projection and are disposed at positions indicated as in FIG. 1, the projection regions of the projectors PJ1 and PJ2 are deformed to shapes different from a rectangular shape.

Aspects of the invention can make it difficult for moiré to occur, which is produced in the related art when projected lights are superimposed, by disposing plural projectors in such a manner that the projection regions formed on the screen SCR are of shapes different from the original shape of projection. More specifically, in a projection mode like the stack projection in which projected lights from plural projectors are superimposed, as has been described, when the rectangular projection regions, which are of the original shape of projection, are superimposed intact, because pixels aligned in the form of a tetragonal lattice have the same size and periodic arrangement in images projected from the respective projectors, interferences of pixels with respect to one another that gives rise to moiré are thought to occur readily.

On the contrary, when the projection regions are superimposed after they are deformed from the original shape of projection, because pixels in the superimposed portion have different sizes and periodic arrangements, pixels do not interfere easily with one another, which can in turn suppress the occurrence of moiré.

FIGS. 2A and 2B and FIGS. 3A and 3B are views showing the location of the projector (herein, the projector PJ1) with respect to the screen SCR when the projector PJ1 is disposed at a specific angle (θ=20° and θ=70°) with respect to the screen SCR, and the distribution of luminance (theoretical values) on the screen SCR. The distribution of luminance shown in the drawings is the one obtained when lights are projected onto the screen SCR by setting the maximum luminance values that can be outputted in all the pixels at the coordinates (referred to as the projector coordinates) on a display device (for example, a liquid crystal display) of the projector PJ1.

When the projector PJ1 is disposed to oppose the screen SCR straight, given 100% as the luminance value on the screen SCR orthogonal to the optical axis from the projection lens of the projector PJ1, then the luminance values on the both ends of the projection region formed on the screen SCR by the projector PJ1 are normally about 80%.

With reference to FIGS. 2A and 2B and FIGS. 3A and 3B, descriptions will be given in a case where the projector PJ1 is disposed at an angle, θ=20°, with respect to the screen SCR (see FIG. 2A) and a case where the projector PJ1 is disposed at an angle, θ=70°, (see FIG. 3A) on the assumption that the screen SCR is 1-m-wide in the lateral direction. In this instance, assume that a distance from the projector PJ1 (the projection lens of the projector PJ1) to a midpoint m on the screen SCR in width in the lateral direction is kept to be 1 m. Hence, because the distance from the projector PJ1 to the midpoint m on the screen SCR is constant, the luminance at the midpoint m on the screen SCR remains the same even when θ varies.

Figure 2A:
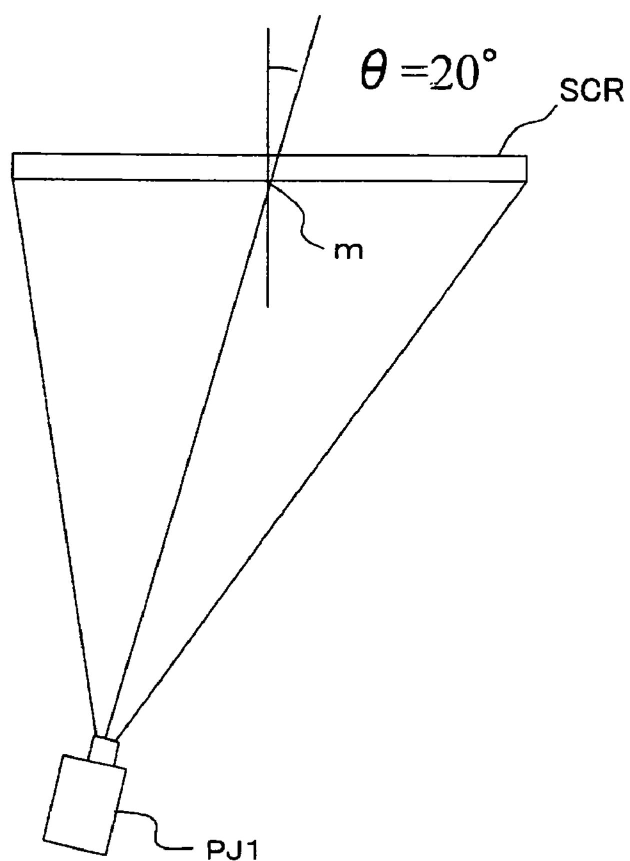
FIGS. 2A and 2B are views showing, respectively, the location of a projector with respect to a screen when the projector is disposed at a specific angle (θ=20°) with respect to the screen, and the distribution of luminance on the screen.
Figure 2B:
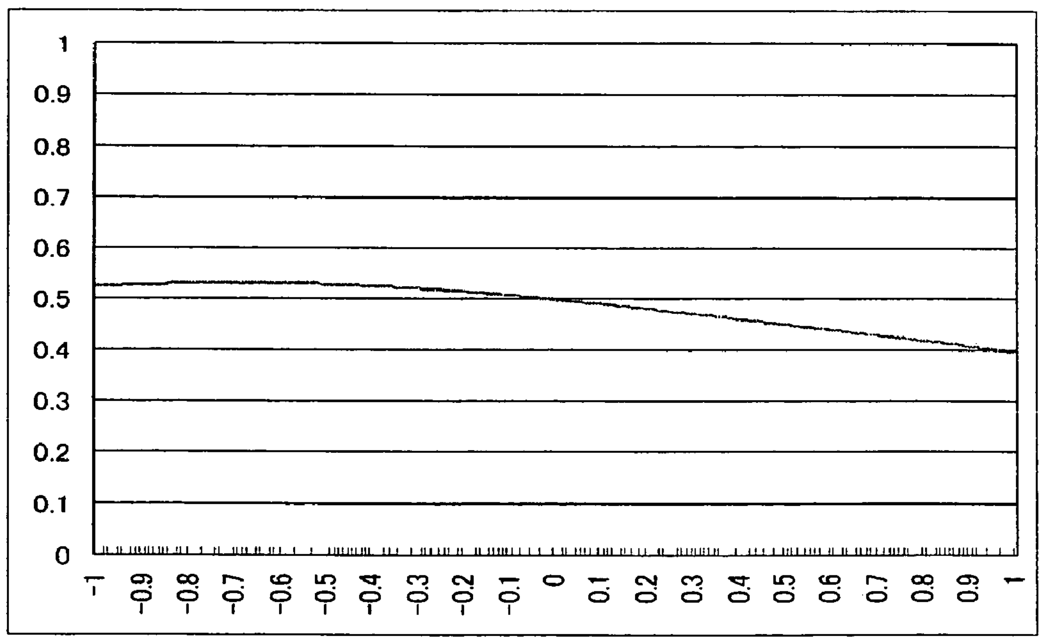
Figure 3A:
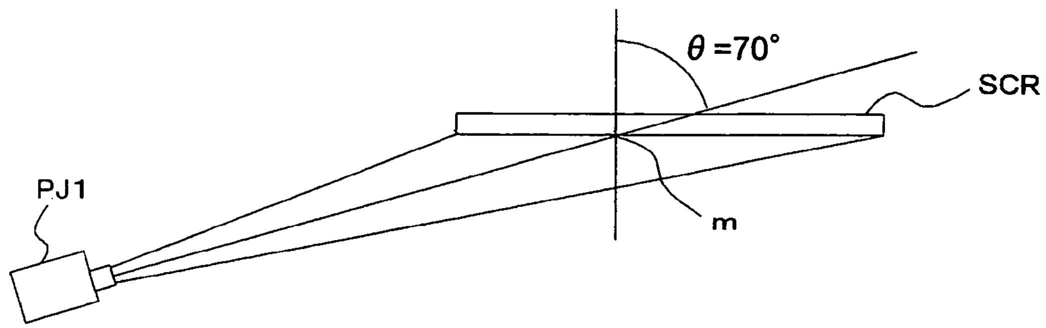
FIGS. 3A and 3B are views showing, respectively, the location of a projector with respect to a screen when the projector is disposed at a specific angle (θ=70°) with respect to the screen, and the distribution of luminance on the screen.
Figure 3B:
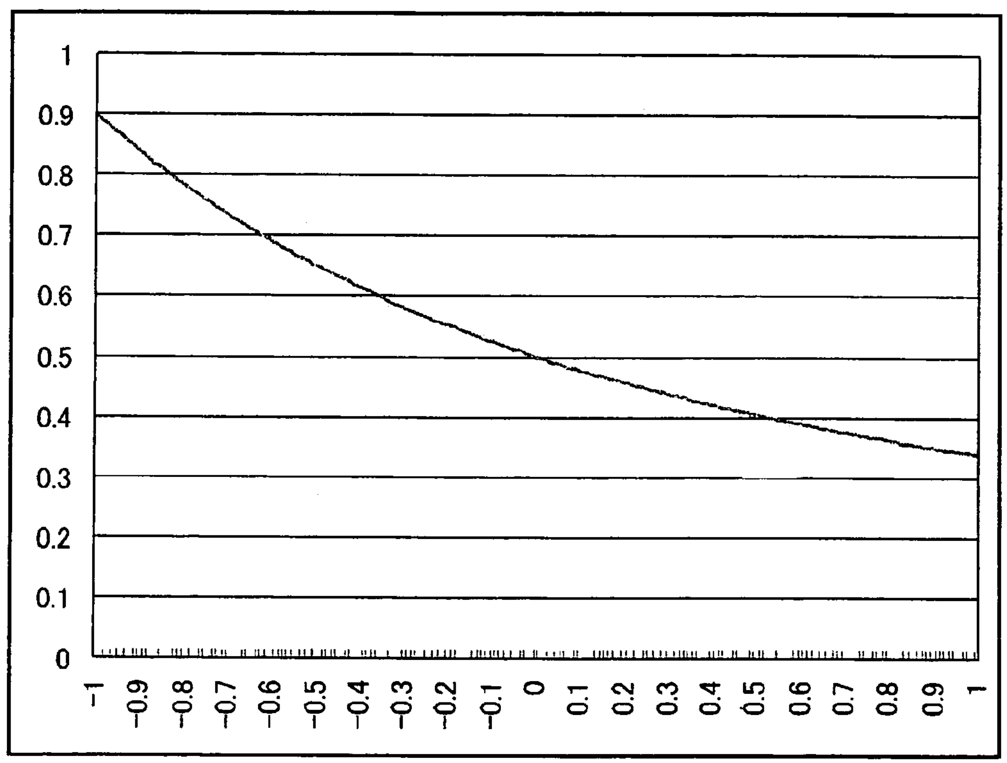

FIG. 2B and FIG. 3B show luminance on the screen SCR at points other than the midpoint m when the luminance at the midpoint m on the screen SCR is 50% of the maximum luminance value at the respective angles (θ=20° and θ=70°). Referring to FIG. 2B and FIG. 3B, the ordinate indicates a change in luminance (1=100%), and the abscissa indicates the position on the screen SCR (0 indicates midpoint m, 1 indicates the right end, and −1 indicates the left end).

As is obvious from FIG. 2B and FIG. 3B, luminance is reduced as the distance from the projector PJ1 to the screen SCR is increased, and a difference in luminance on the screen SCR is increased as the angle, θ, is increased. For example, in the case of angel, θ=70°, as can be understood from FIG. 3B, there is a difference of as large as 50% between the both ends of the screen SCR.

Figure 4A:
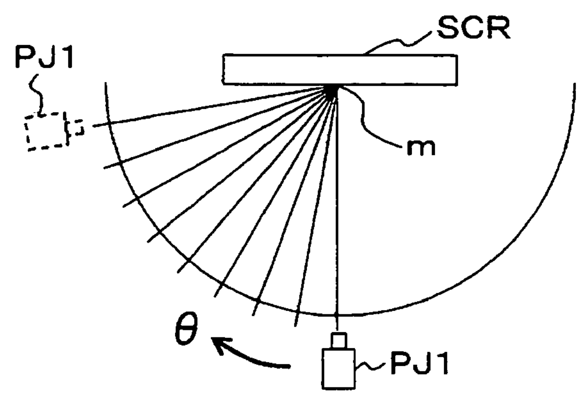
FIGS. 4A and 4B are views showing, respectively the location of a projector with respect to the screen SCR when the projector is shifted by a specific angle from the position at which it opposes the screen straight, and the distribution of luminance on the screen at respective positions.
Figure 4B:
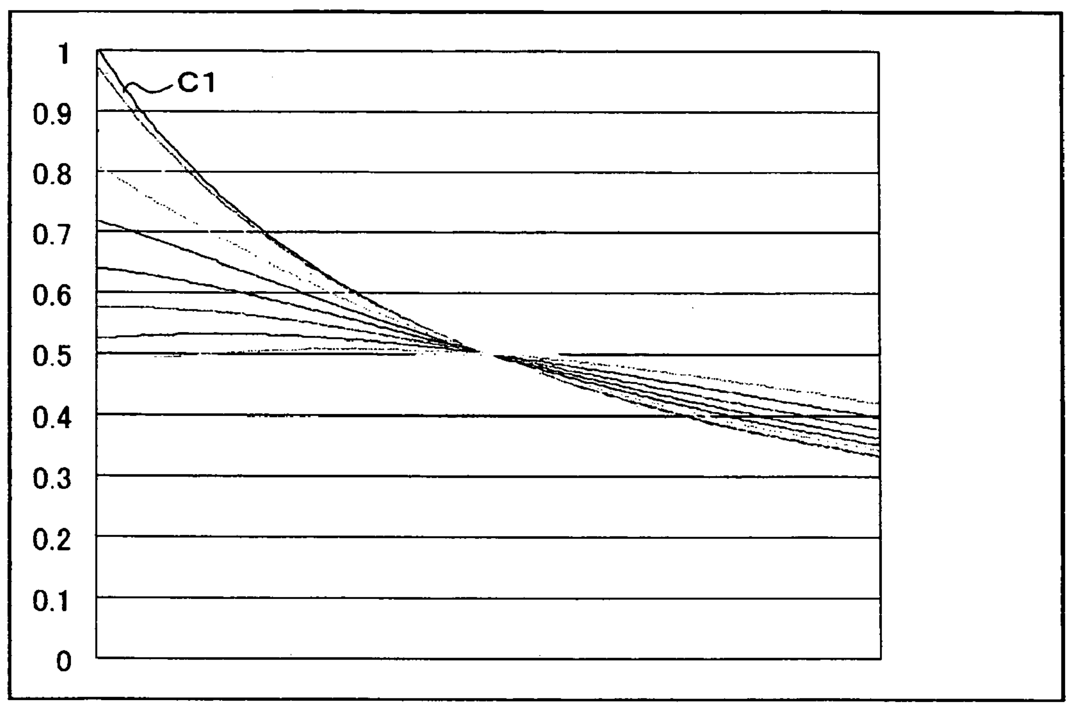

FIG. 4A is a view showing the location of the projector PJ1 with respect to the screen SCR when it is shifted by a specific angle (herein, by 10°) from the position at which it opposes the screen SCR straight, and FIG. 4B is a view showing the distribution of luminance on the screen SCR at respective positions. Referring to FIG. 4A, when the projector PJ1 is shifted to the position indicated by a broken line, the distribution of luminance is the one indicated by a curved line C1 in FIG. 4B.

As is obvious from FIG. 4A and FIG. 4B, for the projection region projected from the projector PJ1, a difference in luminance on the screen SCR is increased as the angle, θ, of the projector PJ1 with respect to the screen SCR is increased. In the case of FIGS. 4A and 4B, too, it is assumed that the screen SCR is 1-m-wide in the lateral direction and that the distance from the projector PJ1 (the projection lens of the projector PJ1) to the midpoint m on the screen SCR in width in the lateral direction is kept to be 1 m.

It is preferable for the invention that a difference in luminance on the screen SCR for the projection region projected from a given projector is large to some extent. Hence, the respective projectors are disposed with respect to the screen SCR in such a manner that each has a specific difference in luminance on the screen SCR.

It is preferable for the invention to set the angle of each projector with respect to the screen SCR so that the maximum value of luminance on the screen SCR is twice or larger the minimum value (a ratio of the maximum value to the minimum value is 2 to 1 or larger) for each projector. The maximum value and the minimum value of luminance on the screen SCR referred to herein are defined as the maximum value and the minimum value of luminance obtained from the distribution of luminance when lights are projected onto the screen SCR by setting the maximum luminance values that can be outputted in all the pixels on the display device (for example, a liquid crystal panel) of each projector.

Herein, because luminance is inversely proportional to the area of each image on the screen SCR, resolution becomes higher as the luminance becomes higher (the area on the screen SCR covered by a single pixel of the projector becomes narrower), and resolution becomes lower as the luminance becomes lower (the area on the screen SCR covered by a single pixel of the projector becomes wider). It is also preferable that the maximum value of a projection area on the screen SCR covered by the pixels provided to a given projector is twice or larger the minimum value (a ratio of the maximum value to the minimum value is 2 to 1 or larger).

Figure 5A:
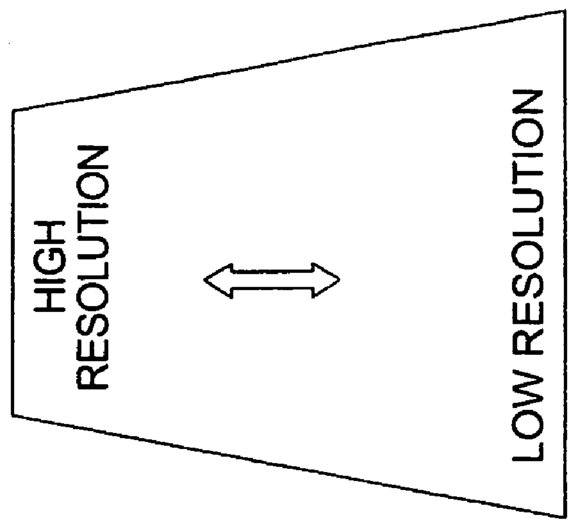
FIGS. 5A and 5B are views showing projection regions on the screen when two projectors are disposed at specific angles with respect to the screen.
Figure 5B:
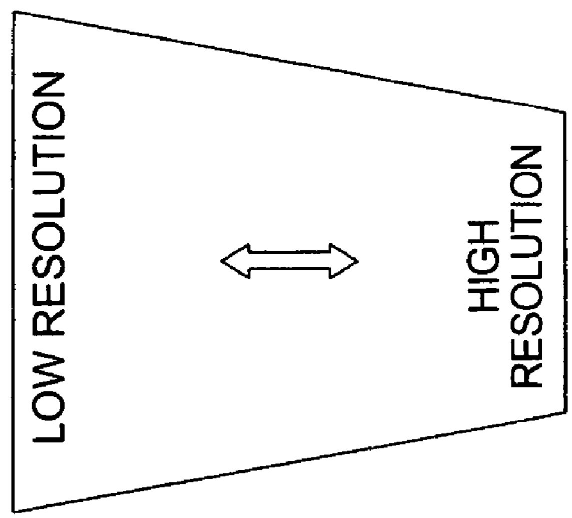
Figure 6:
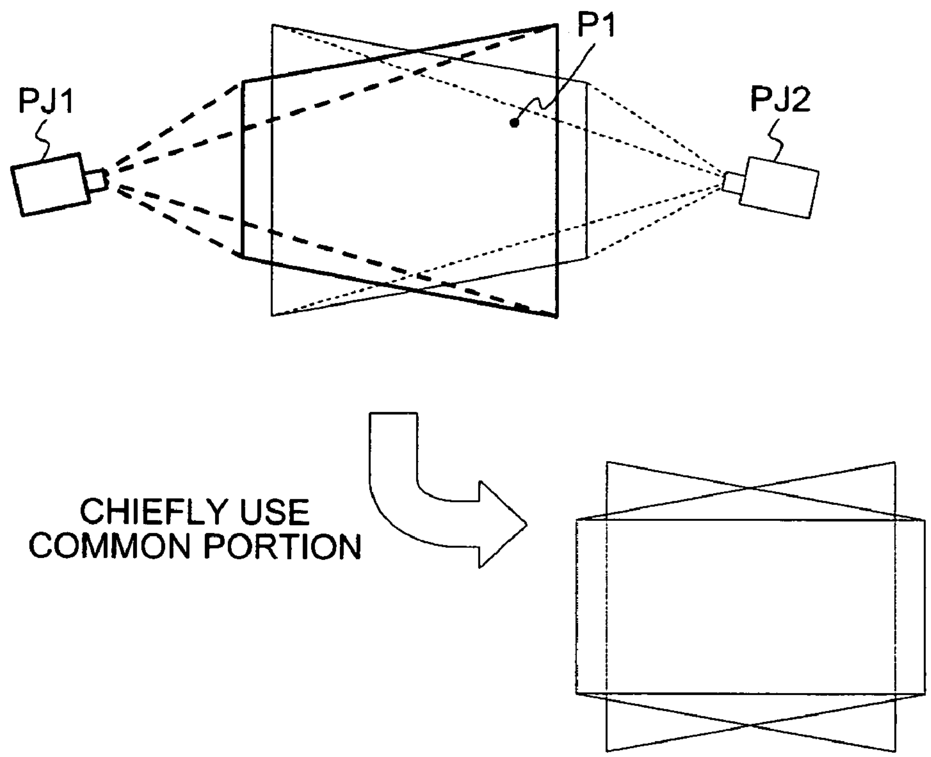
FIG. 6 is a view showing an example of the location of two projectors disposed at specific angles with respect to the screen, and projection regions on the screen.

FIGS. 5A and 5B are views showing projection regions on the screen SCR when two projectors PJ1 and PJ2 are disposed at specific angles with respect to the screen SCR (for example, as is shown in FIG. 6). FIG. 5A shows a projection region formed on the screen SCR by the projector PJ1, and FIG. 5B is a projection region formed on the screen SCR by the projector PJ2. In these cases, in the projection region formed by the projector PJ1, resolution is higher on the left side than on the right side, whereas in the projection region formed by the projector PJ2, resolution is higher on the right side than on the left side.

FIG. 6 is a view showing an example of the locations of the projector PJ1 and PJ2 with respect to the screen SCR in a case where the stack projection is performed by disposing the two projectors PJ1 and PJ2 at specific angles with respect to the screen SCR, and the respective projection regions on the screen SCR. Referring to FIG. 6, the projection region formed by the projector PJ1 is indicated by a thick line and the projection region formed by the projector PJ2 is indicated by a thin line. In the above-described projection mode, a common portion of the two projection regions is used as a display region of an image (content) to be displayed.

By projecting lights diagonally from the respective projectors PJ1 and PJ2 to the screen SCR so that the projection regions formed by the respective projectors PJ1 and PJ2 on the screen SCR are of shapes different from the original shape of projection as described above, it is possible to vary the size and the luminance value of pixels as well as the periodic arrangement of pixels in a superimposed portion when the projection regions formed by the projector PJ1 and PJ2 are superimposed. The pixels thus do not readily interfere with one another, which can in turn suppress the occurrence of moiré.

A case of the stack projection using two projectors has been described; however, it should be understood that three or more projectors car be used. By projecting lights diagonally to the screen SCR from a number of projectors in such a manner that the projection regions are of shapes different from the original shape of projection as described above, it is possible to align pixels in different sizes at different luminance values on the screen SCR in the form other than a tetragonal lattice. It is thus possible to vary the size and the luminance value of pixels as well as the periodic arrangement of pixels in the superimposed portion.

The following description will describe two examples of an image information (pixel value) generating method adapted to the respective projectors in the display apparatus in which plural projectors are disposed with respect to the screen SCR in such a manner that the projection regions formed on the screen SCR by the respective projectors are of shapes different from the original shape of projection.

One of the two image information generating methods described below is referred to as a first image information generating method, and the other is referred to as a second image information generating method.

In both of the first image information generating method and the second image information generating method, assume that the stack projection is performed using two projectors (projectors PJ1 and PJ2) that are disposed with respect to the screen SCR, for example, as is shown in FIG. 1. In addition, assume that image information (pixel value) generated by the first image information generating method and the second image information generating method is a luminance value.

In the first image information generating method, the screen is divided into sub-regions, and processing is performed on the sub-regions one by one. The processing to divide the screen into sub-regions is actually performed on the memory in the computer or the like, and this processing can be therefore deemed as virtual screen dividing processing.

Also, the correspondence between the coordinates (screen coordinates) indicating respective pixel positions on the screen SCR and the coordinates (projector coordinates) indicating respective pixel positions on the display devices, such as the liquid crystal panels, of the respective projectors PJ1 and PJ2, has been known previously as a precondition for the processing to be performed. In short, it has previously been known that at which position and at which resolution the respective projectors PJ1 and PJ2 project lights onto the screen SCR. These can be known through a known technique using an imaging device or the like.

Figure 7:
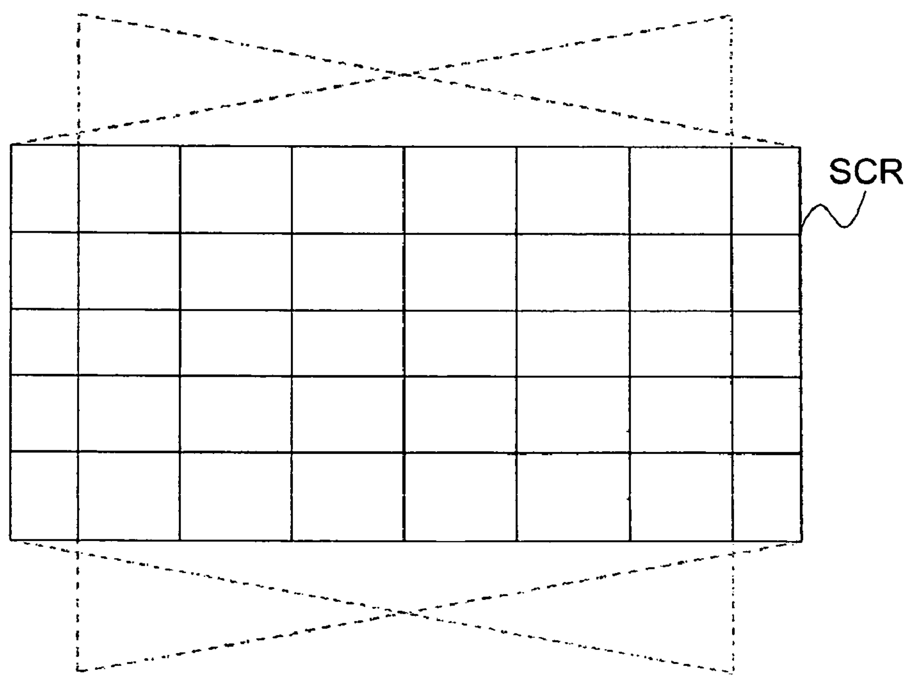
FIG. 7 is a view showing an example when the screen is divided into sub-regions.

Initially, in Procedural Step 1, the screen SCR is divided to obtain plural sub-regions. FIG. 7 is a view showing an example of the screen SCR divided into sub-regions. Referring to FIG. 7, respective rectangles partitioned lattice-wise represent sub-regions. Assume that resolutions of the respective projectors PJ1 and PJ2 vary little within the sub-regions obtained by dividing the screen SCR. Conversely, the screen SCR is divided into sub-regions in such a manner that resolution varies little within the respective sub-regions.

Subsequently, in Procedural Step 2, the resolutions (the numbers of pixels) of the respective projectors PJ1 and PJ2 for all the sub-regions are found one by one. Assume that the screen SCR is divided into sub-regions in such a manner that there will be an obvious difference between the resolution (the number of pixels) of the projector PJ1 and the resolution (the number of pixels) of the projector PJ2 for a given sub-region.

From the resolutions (the numbers of pixels) of the projectors PJ1 and PJ2 for the respective sub-regions thus found, it is understood that the number of pixels on the screen SCR covered by a single pixel of the projector becomes larger and the maximum luminance value becomes lower in a sub-region of interest as the obtained resolution of the sub-region of interest becomes lower (as the obtained number of pixels becomes smaller).

Subsequently, in Procedural Step 3, a luminance value as the pixel information (pixel value) is allocated first to the projector judged as having the lower resolution for the sub-region of interest. This processing is performed for all the sub-regions. The processing to allocate the luminance value to the pixels of the respective projectors covering the sub-region of interest will now be described.

Figure 8:
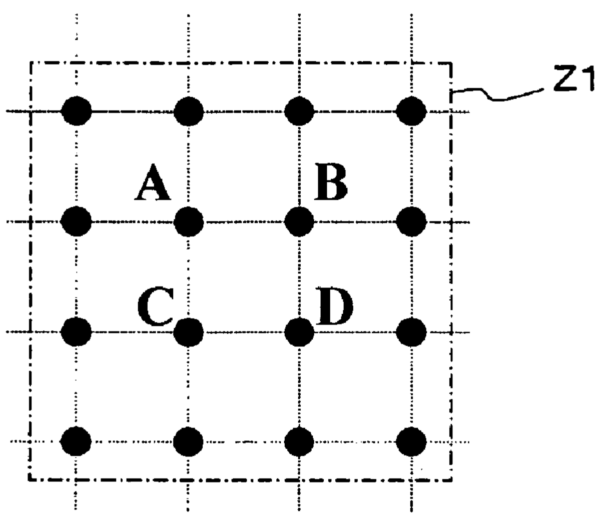
FIG. 8 is a view showing a given sub-region on the screen.

FIG. 8 is a view showing a given sub-region Z1 on the screen SCR. The sub-region Z1 is supposed to be a region corresponding to a position in the vicinity of P1 in FIG. 6. For ease of description, the sub-region Z1 shown in FIG. 8 is the one obtained when the screen SCR is divided extremely finely, and it does not necessarily correspond to the sub-regions shown in FIG. 7 divided by way of example. Also, the sub-region Z1 shown in FIG. 8 is an example where a sub-region is made of 16 pixels: 4 pixels×4 pixels. Black dots in the sub-region Z1 represent pixels on the screen SCR for the content to be displayed.

Figure 9:
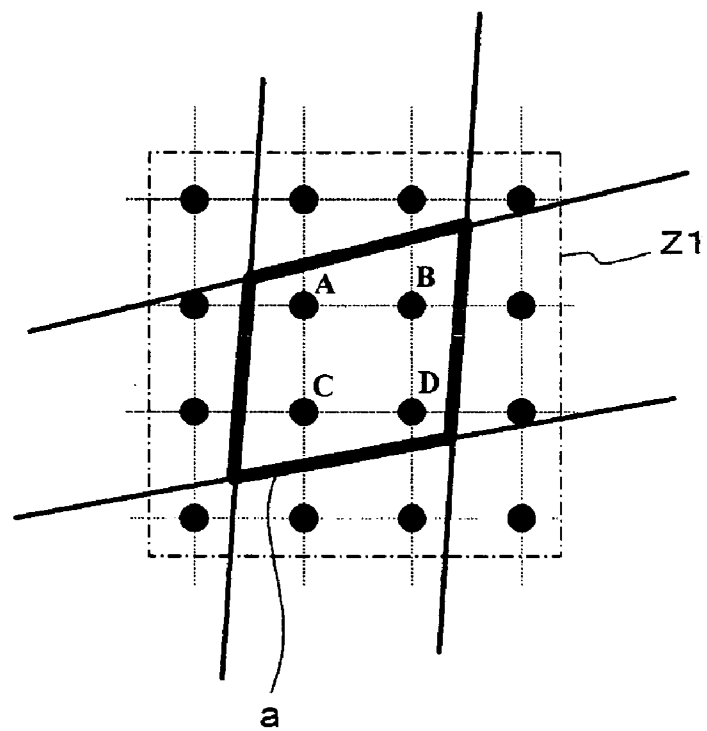
FIG. 9 is a view showing a manner in which respective pixels of one projector PJ1 cover one sub-region on the screen shown in FIG. 8.

FIG. 9 is a view showing a manner in which respective pixels of the projector PJ1 cover one sub-region Z1 on the screen SCR shown in FIG. 8. Because the projector PJ1 is at a position remote from P1 in FIG. 6, respective pixels of the projector PJ1 corresponding to the position P1 cover a wide range.

In the case of FIG. 9, 16 pixels within the sub-region Z1 on the screen SCR are covered by almost 9 pixels of the projector PI1. Let us consider four pixels A, B, C, and D within the sub-region Z1, then these four pixels A, B, C, and D are covered by a single pixel (let this pixel be a pixel a indicated by a thick frame) of the projector PJ1.

Figure 10:
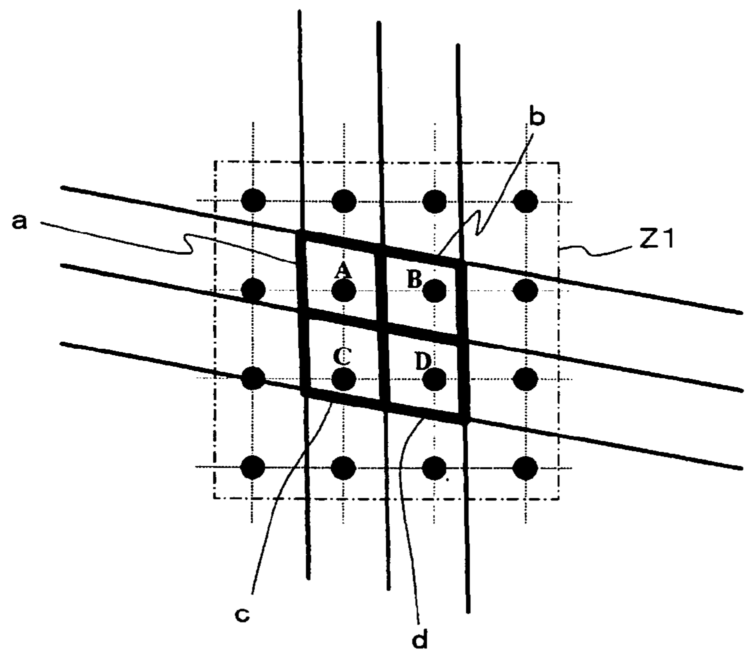
FIG. 10 is a view showing a manner in which respective pixels of the other projector PJ2 cover one sub-region on the screen shown in FIG. 8.

FIG. 10 is a view showing a manner in which respective pixels of the projector PJ2 cover one sub-region Z1 on the screen SCR shown in FIG. 8. Because the projector PJ2 is at a position close to P1 in FIG. 6, respective pixels of the projector PJ2 corresponding to the position P1 cover a narrow range.

In the case of FIG. 10, the sub-region Z1 on the screen SCR is covered by almost 16 pixels of the projector PJ2. Let us consider four pixels A, B, C, and D within the sub-region Z1, then these four pixels A, B, C, and D correspond, respectively, to four pixels (let these pixels be pixels a, b, c, and d, each indicated by a thick frame) of the projector PJ2. In short, in the case of FIG. 10, for the sub-region Z1, pixels on the screen SCR correspond to pixels of the projector PJ2 in a one-to-one correspondence.

As are shown in FIG. 9 and FIG. 10, it is possible to obtain the resolutions (the numbers of pixels) of the respective projectors PJ1 and PJ2 for a given sub-region. In the examples of FIG. 9 and FIG. 10, the resolution (the number of pixels) of the projector PJ1 for the sub-region Z1 is 9, and the resolution (the number of pixels) of the projector PJ2 for the sub-region Z1 is 16. It is thus understood that the projector PJ2 has the higher resolution and luminance for the sub-region Z1.

When the resolutions are obtained in this manner, the luminance value is allocated first to the projector having the lower resolution according to the processing in Procedural Step 3.

In this example, because the projector PJ1 has the lower resolution than the projector PJ2 for the sub-region Z1, the luminance value is allocated first to the projector PJ1.

Figure 11A:
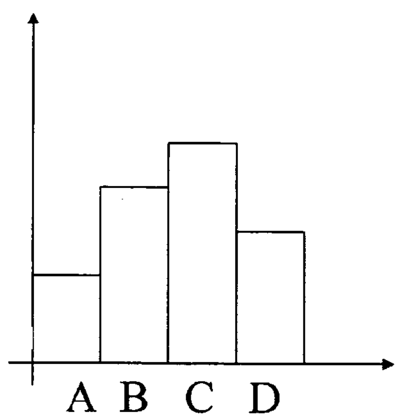
FIGS. 11A and 11B are views used to describe the allocation of luminance values.
Figure 11B:
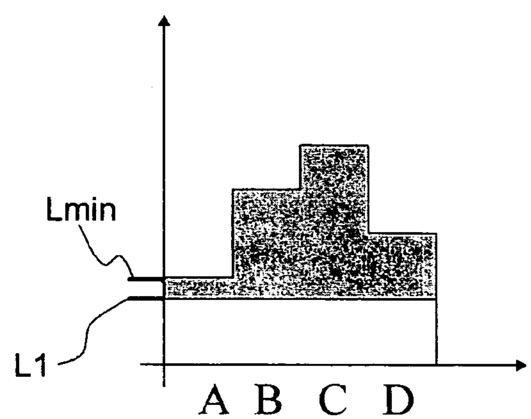

FIGS. 11A and 11B are views used to describe a manner in which the luminance value is allocated. Normally, the luminance value is allocated to the respective pixels of the projectors PJ1 and PJ2 corresponding to all the pixels within the sub-region Z1. For ease of description, however, descriptions will be given to only the pixels A, B, C, and D within the sub-region Z1. FIG. 1I A shows desired luminance values that should be displayed by the pixels A, B, C, and D.

The luminance value is first allocated to a pixel of the projector PJ1 (the pixel a in the projector PJ1 shown in FIG. 9) corresponding to the pixels A, B, C, and D within the sub-region Z1. Herein, let L1 in FIG. 11B be the luminance value to be allocated to the pixel a of the projector PJ1. The luminance value L1 is set to a given luminance value that is equal to or lower than the minimum luminance value Lmin in all the pixels to be displayed within the sub-region of interest. In this embodiment, in order to prevent black isolation, the luminance value L1 allows for a slight margin with respect to the minimum luminance value Lmin, and it therefore takes a value slightly smaller than the luminance value Lmin.

Because only the pixels A, B, C, and D within the sub-region Z1 are considered in the example of FIGS. 11A and 11B, assume that the pixel A has the minimum luminance value Lmin in all the pixels to be displayed. Hence, in this exemplary embodiment, the luminance value allocated to the pixel a of the projector PJ1 is the luminance value L1 slightly smaller than the luminance value Lmin of the pixel A.

When the luminance value has been allocated to the projector PJ1 having the lower resolution for the sub-region Z1 of interest in this manner, the luminance value is then allocated to the projector PJ2 having the higher resolution for the sub-region Z1 of interest. When the luminance value is allocated to the projector PJ2 having the higher resolution, the luminance value that has been allocated to the projector PJ1 having the lower resolution, and the luminance values of the rest of the desired luminance values that should be displayed (see FIG. 11A) are allocated.

In the case of FIG. 1I B, because the pixels A, B, C, and D correspond, respectively, to the pixels a, b, c, and d of the projector PJ2, the pixel values are allocated to these pixels A, B, C, and D individually. Referring to FIG. 11B, a gray portion indicates the pixel values allocated to the respective pixels a, b, c, and d of the projector PJ2.

The allocation processing of the luminance value is performed for all the sub-regions obtained as a result when the screen SCR is divided. Although it has not been explicitly described, the allocation of the luminance value is also performed for all the color components (for example, red, green, and blue) color by color.

Figure 12:
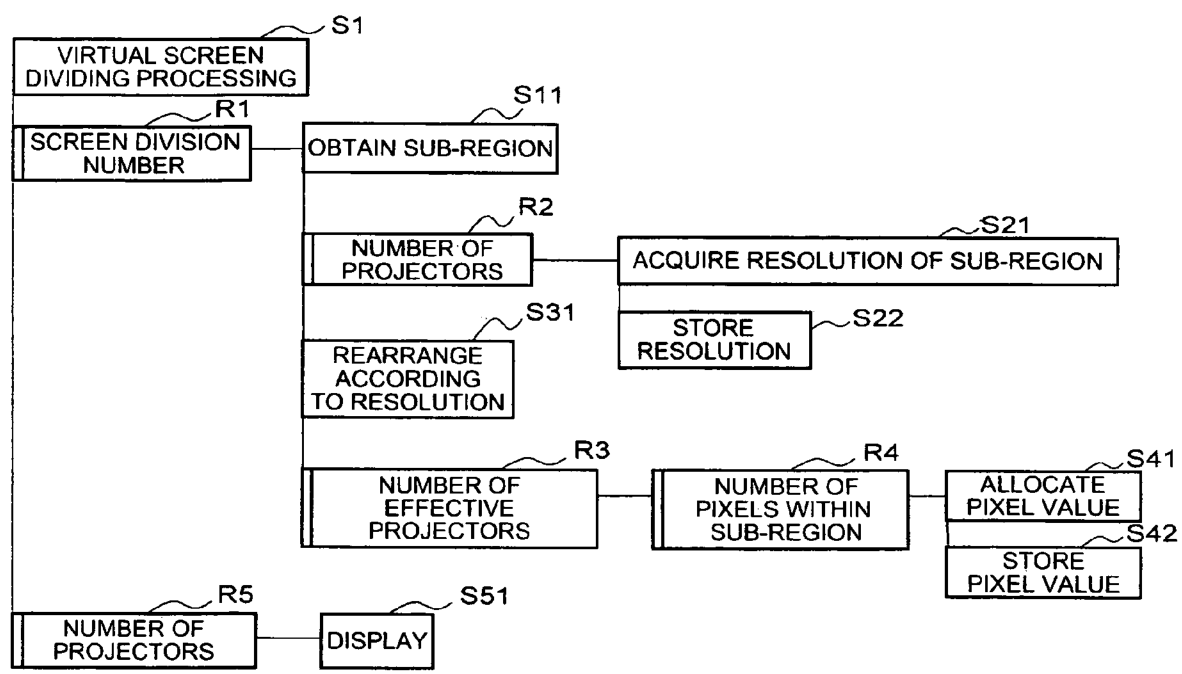
FIG. 12 is a view showing the procedural steps of a first image information generating method in the form of a PDA.

FIG. 12 is a view showing the procedural steps of the first image information generating method in the form of a PAD (Problem Analysis Diagram). Because each processing (for example, the processing to allocate the pixel value) shown in FIG. 12 has been described above, detailed descriptions of the processing will be omitted from descriptions with reference to FIG. 12.

Referring to FIG. 12, the virtual screen dividing processing (Processing S1), that is, the processing to divide the screen into sub-regions, is performed first. The processing as follows is repeated as many times as the screen division number (the number of sub-regions obtained by dividing the screen) (repetition condition R1). In this processing, a sub-region to be processed (referred to as a sub-region of interest) is obtained first (Processing S11), and as many resolutions as the number of projectors (repetition condition R2) are obtained for the sub-region thus obtained (Processing S21). The resolutions thus obtained are then stored (Processing S22). The foregoing processing is performed for all the projectors, and when the processing is completed for all the projectors, the projectors are rearranged according to the resolutions (Processing S31).

The processing as follows is performed as many times as the number of effective projectors (repetition condition R3) on the basis of the result of the rearrangement according to the resolutions. In this processing, the allocation of the pixel value is performed as many times as the number of pixels within the sub-region of interest (repetition condition R4) (Processing S41), and the pixel values thus allocated are stored (Processing S42). The processing S41 and the processing S42 are performed for all the pixels within the sub-region of interest. These are also performed for all the effective projectors. The number of effective projectors referred to herein can mean the projectors that are projecting lights onto the sub-region of interest. The other projectors are therefore not subject to the processing.

The same processing is performed for the following sub-region, and when the processing is completed for all the sub-regions, an image is displayed on the basis of the given pixel values as many times as the number of projectors forming the display apparatus (repetition condition R5)(Processing S51).

Figure 13:
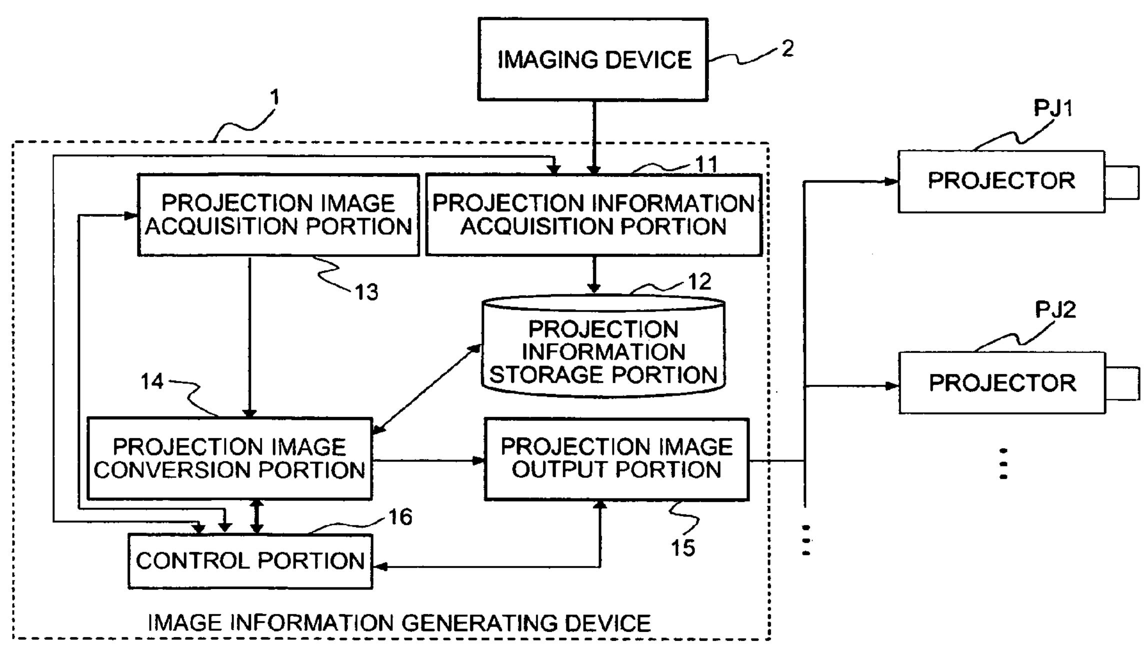
FIG. 13 is a view showing the configuration of an image information generating device used in the first image information generating method.

FIG. 13 is a view showing the configuration of an exemplary image information generating device used in the first image information generating method. The first image information generating method has been described using two projectors; however, it is possible to use two or more projectors in the configuration shown in FIG. 13.

Referring to FIG. 13, an image information generating device 1 can include a projection information acquisition portion 11 that acquires projection information on the basis of imaging information acquired by taking an image of the screen SCR using an imaging device 2, a projection information storage portion 12 that stores the projection information acquired in the projection information acquisition portion 11, a projection image acquisition portion 13 that acquires a projection image to be projected from the respective projectors PJ1, PJ2, and so forth. The device 1 can further include a projection image conversion portion 14 that converts a shape and luminance of a projection image to those of images to be projected from the respective projectors PJ1, PJ2, and so forth, on the basis of the projection information and the projection image, a projection image output portion 15 that outputs images to be projected to the respective projectors PJ1, PJ2, and so forth, and a control portion 16 that controls these projection information generating portion 11, projection image acquisition portion 12, projection information storage portion 13, projection image conversion portion 14, and projection image output portion 15.

The projection information stored in the projection information storage portion 13 can include projector coordinates indicating the positions of the respective pixels on the display devices of the respective projectors PJ1, PJ2, and so forth, the screen coordinates indicating on which positions on the screen SCR the projector coordinates are mapped, an area on the screen SCR covered by each pixel of the respective projectors PJ1, PJ2, and so forth, and the maximum luminance value that each pixel can output. An example of the projection information is the contents as are shown in FIGS. 14A and 14B used when a second image information generating method will be described below.

The conversion of luminance (for example, the allocation of the luminance to the respective pixels) performed by the projection image conversion portion 14 is the same as has been described above.

According to the first image information generating method, it is possible to generate highly accurate image information (luminance values) given to the respective pixels of each of plural projectors that are disposed with respect to the screen SCR in such a manner that projection regions formed on the screen SCR by these projectors are of shapes different from the original shape of projection.

The second image information generating method is to create tables in advance from which the projector coordinates of the respective projectors corresponding to the screen coordinates, the size of the pixels at the projector coordinates (the areas that can be projected on the screen SCR), the maximum luminance values that can be outputted, the numbers identifying the projectors (projector numbers) can be acquired, so that the pixel values (luminance values) to be displayed on the screen SCR can be set in the respective pixels at the projector coordinates of the respective projectors with reference to the tables.

FIGS. 14A, 14B, and 14C are views showing the contents of the tables used in the second image information generating method. FIG. 14A shows a table written with data about the projector PJ1. FIG. 14B shows a table written with data about the projector PJ2.

In the tables written with the data about the projectors PJ1 and PJ2, the projector coordinates indicating the positions of the respective pixels on the display devices of the projectors PJ1 and PJ2, the screen coordinates indicating on which positions on the screen SCR the projector coordinates are mapped, an area on the screen SCR covered by each pixel of the projectors PJ1 and PJ2, and the maximum luminance value that each pixel can output, are written as data.

The tables shown in FIGS. 14A and 14B are made into one table in reference to the screen coordinates as is shown in FIG. 14C. The table in FIG. 14C, being a table in reference to the screen coordinates, is created by merging and sorting the contents of the tables in FIGS. 14A and 14B, from which the projector coordinates corresponding to the screen coordinates, the area covered by a pixel at each projector coordinate, the maximum luminance values that can be outputted, and the projector numbers can be acquired.

When a pixel located at a given screen coordinate is to be displayed at a given luminance value, it is possible to determine what luminance value needs to be given to the corresponding pixels of the respective projectors from the table shown in FIG. 14C. Specifically, in a case where a pixel located at a given screen coordinate is to be displayed at a given luminance value, for example, a pixel located at a position close to the screen coordinate is found to be a pixel located at the projector coordinate (0000, 0000) of the projector PJ1 from FIG. 14C. Then, 80 is acquired, which is the luminance value of the pixel located at the projector coordinate (0000, 0000) of the projector PJ1.

When the luminance value of 80 thus acquired is insufficient for a desired luminance value that should be displayed on the screen SCR, a specific luminance value is given to a pixel of the other projector having a pixel located at position close to the pixel of interest (at a nearby position in the table shown in FIG. 14C).

In the case of FIG. 14C, the projector coordinate (0000, 0000) of the projector PJ2 is found to be a position close to the projector coordinate (0000, 0000) of the projector PJ1. The pixel at the projector coordinate (0000, 0000) of the projector PJ2 has a larger luminance value of 320. Hence, a difference between the luminance value of the pixel at the projector coordinate (0000, 0000) of the projector PJ1 and the desired luminance value that should be displayed is allocated to the pixel at the projector coordinate (0000, 0000) of the projector PJ2.

Hence, in this case by allocating the luminance value of 80 to the corresponding pixel of the projector PJ1 and allocating the remaining pixel values to the projector PJ2, and then superimposing lights projected from the two projectors PJ1 and PJ2, the pixel that should be displayed on the screen SCR can be displayed at the desired luminance value.

In a case where a pixel located at a given screen coordinate is to be displayed at a given luminance value, when it is revealed from FIG. 14C that a pixel located at the projector coordinate of a given projector and at a position close to the screen coordinate has a sufficiently high luminance value for the desired luminance value that should be displayed, a luminance value needed for display is given to the pixel of the projector, so that the pixel is displayed by the projector. The luminance values for the respective projectors are set color by color (for example, for red, green, and blue one by one) with reference to the tables as described above.

Figure 15:
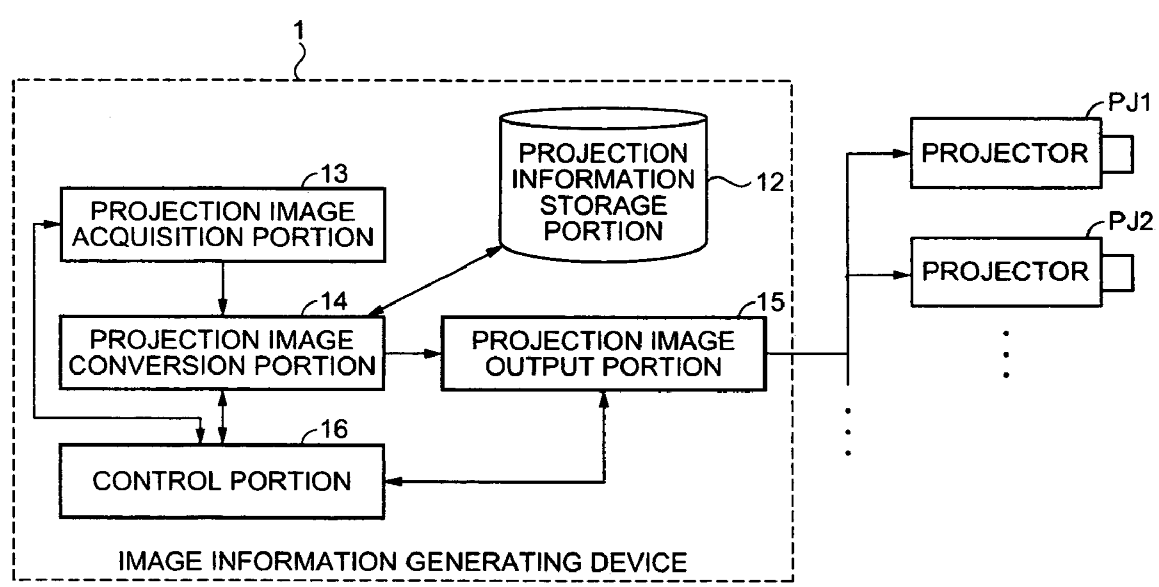
FIG. 15 is a view showing the configuration of an image information generating device used in the second image information generating method.

FIG. 15 is a view showing the configuration of an image information generating device used in the second image information generating method. It is also possible to use two or more projectors in the configuration of FIG. 15.

An image information generating device 1 shown in FIG. 15 can include a projection information storage portion 12 that stores projection information, a projection image acquisition portion 13 that acquires a projection image to be projected from the respective projectors PJ1, PJ2, and so forth, a projection image conversion portion 14 that converts a shape and luminance of a projection image to those of an image projected from the respective projectors PJ1, PJ2, and so forth on the basis of the projection information and the projection image, a projection image output portion 15 that outputs images to be projected to the respective projectors PJ1, PJ2, and so forth, and a control portion 16 that controls these projection information storage portion 12, projection image acquisition portion 13, projection image conversion portion 14, and projection image output portion 15.

The projection information stored in the projection information storage portion 12 is of the contents shown, for example, FIGS. 14A, 14B, and 14C. Such data can be created in advance. For example, it is possible to store the projection information created in advance to the projection information storage portion 12 at the time of shipment of the display apparatus. It is possible to store only the table shown in FIG. 14C, which is created by merging and sorting the contents of the tables shown in the FIG. 14A and FIG. 14B.

The conversion of luminance (the allocation of the luminance to the respective pixels) performed by the projection image conversion portion 14 is the same as has been described above.

As has been described, according to the second image information generating method, it is possible to create in advance tables from which the projector coordinates corresponding to the screen coordinates, the sizes of the pixels at the projector coordinates (the areas that can be projected on the screen SCR), the maximum luminance values that can be outputted, the numbers identifying the projectors (projector numbers) can be acquired, so that the luminance values that should be displayed on the screen SCR can be set in the respective projectors with reference to the tables. It is thus possible to complete the settings by determining which pixel of which projector is to be displayed at which luminance value for the respective pixels on the screen SCR by merely referring to the tables.

According to the second image information generating method, too, it is possible to generate highly accurate image information given to the respective projectors that are disposed with respect to the screen SCR in such a manner that projection regions formed by plural projectors on the screen SCR are of shapes different from the original shape of projection.

Figure 16:
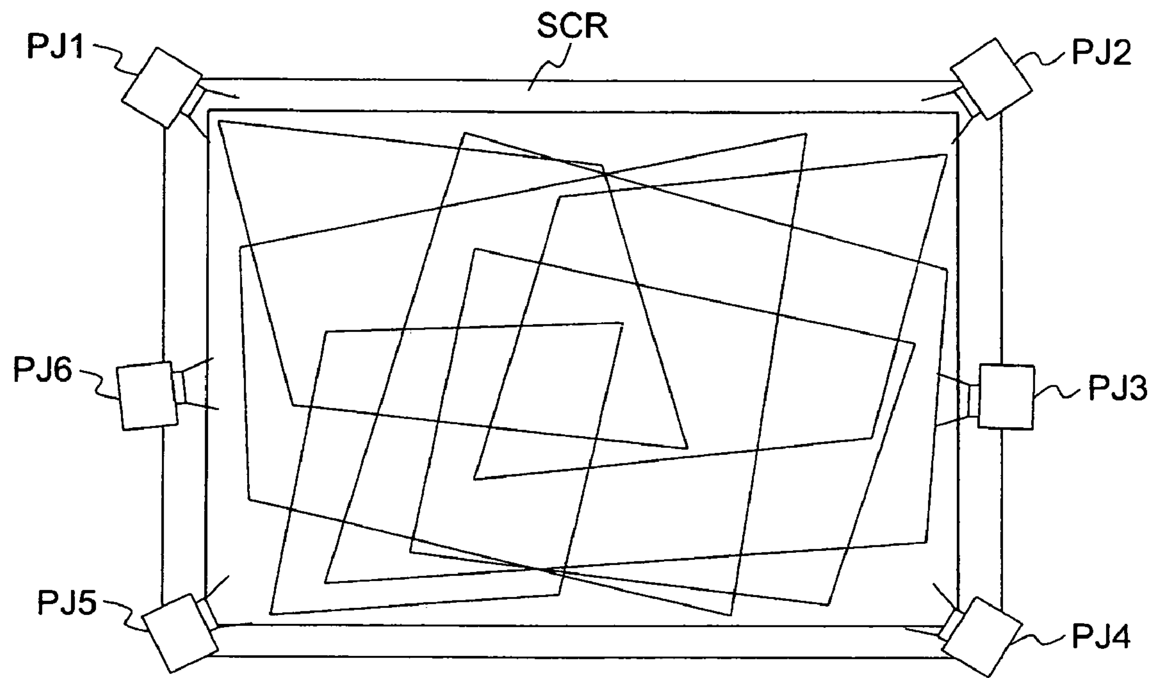
FIG. 16 is a view showing an example of the stack projection using a number of projectors PJ1, PJ2, . . .

In addition, because the pixel information given to the respective projectors with reference to the tables can be set at high accuracy, the second image information generating method is suitable for the stack projection using a number of projectors as is shown in FIG. 16. FIG. 16 is a view showing an example of the stack projection using a number of projectors PJ1, PJ2, and so forth. FIG. 16 shows an example using six projectors PJ1 through PJ6.

In this case, tables as those shown in FIGS. 14A and 14B are created for each of the projectors PJ1 through PJ6. Then, a table as the one shown in FIG. 14C is created in advance on the basis of the contents of the respective tables thus created, that is, a table from which the projector coordinates corresponding to the screen coordinates, an area covered by a pixel at each projector coordinate, the maximum luminance values that can be outputted, and the numbers identifying the projectors (projector numbers) can be acquired. By referring to this table, it is possible to complete the settings by determining which pixel of which projector among a number of projectors needs to be displayed at which luminance value for the respective pixels on the screen SCR.

It should be appreciated that the invention is not limited to the exemplary embodiment above, and the invention can be modified in various manners without deviating from the scope of the invention. For example, it goes without saying that the invention is also applicable to a rear display apparatus.

Figure 17:
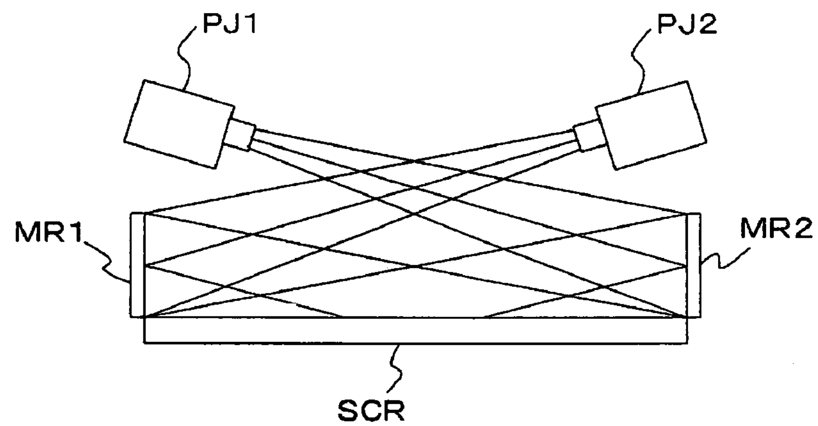
FIG. 17 is a view showing an example when the invention is applied to a rear display apparatus.

FIG. 17 is a view showing an example of a rear display apparatus. FIG. 17 shows an example where projected lights from plural projectors (for example, two projectors PJ1 and PJ2) are projected onto the screen SCR after they are reflected on corresponding mirrors MR1 and MR2.

It has been described that the projectors are disposed with respect to the screen in such a manner that the projection regions formed on the screen by the respective projectors forming the display apparatus are of shapes different from the original shape of projection of the projectors; however, not all the projectors have to be disposed in this manner. In other words, in terms of the purpose to suppress moiré, of plural projectors forming the display apparatus, it is sufficient to dispose plural projectors in such a manner that at most one projector forms a projection region of the original shape of projection.

For example, in the case of the tiling projection or the stack projection using a number of projectors, of plural projectors having projection regions to be superimposed on the screen, it is sufficient to dispose some of the projectors having projection regions to be superimposed in such a manner that at most one projector forms a projection region of the original shape of projection.

It has been described that plural projectors are disposed in such a manner that at most one projector among plural projectors forming the display apparatus forms a projection region of the original shape of projection; however, projectors may be disposed according to the idea as follows by taking into account that the original shape of projection is not necessarily a rectangular shape.

Figure 18:
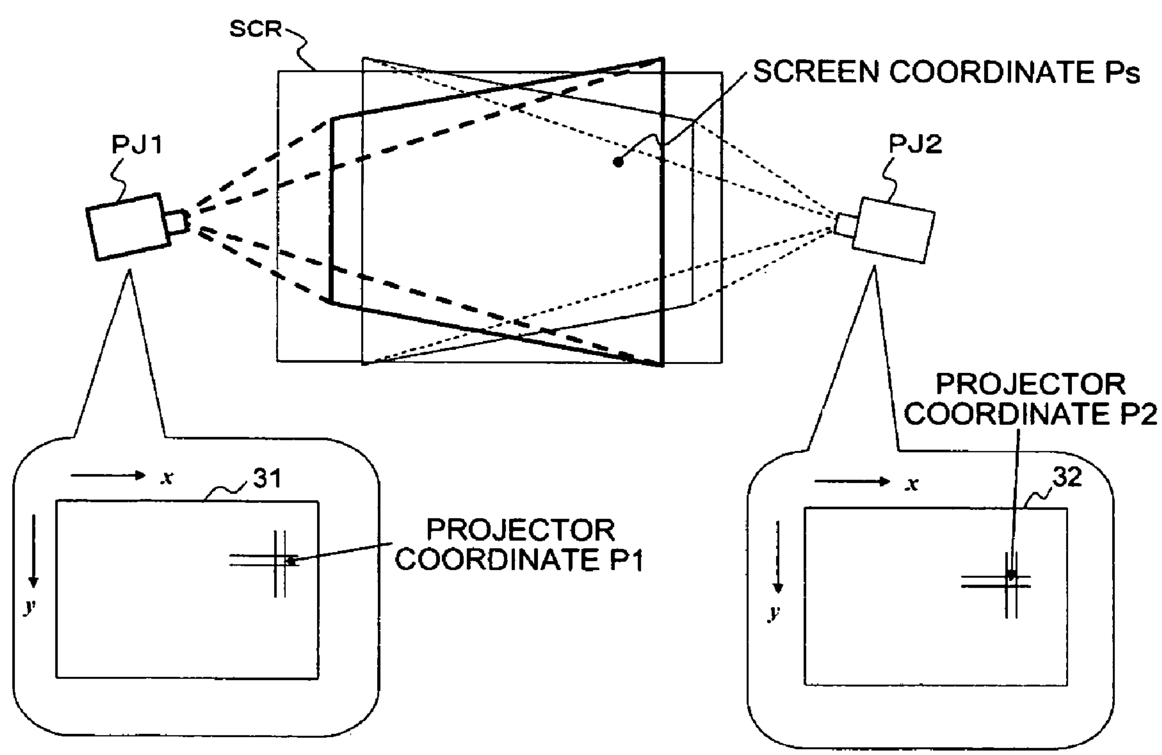
FIG. 18 is a view used to describe another example of the location of plural projectors with respect to the screen.

FIG. 18 is a view used to describe another manner in which plural projectors (two projectors PJ1 and PJ2 herein, too) are disposed with respect to the screen. Referring to FIG. 18, assume that the coordinates (projector coordinates) of pixels on the display devices 31 and 32 of the projectors PJ1 and PJ2 corresponding to the coordinate (the screen coordinate Ps) of a given pixel on the screen SCR are a projector coordinate P1 of the projector PJ1 and a projector coordinate P2 of the projector PJ2. For the coordinates on the display devices 31 and 32 of the projectors PJ1 and PJ2, respectively, let x be the rightward direction and y be the downward direction using the upper left corner of the drawing as the base point.

Figure 19A:
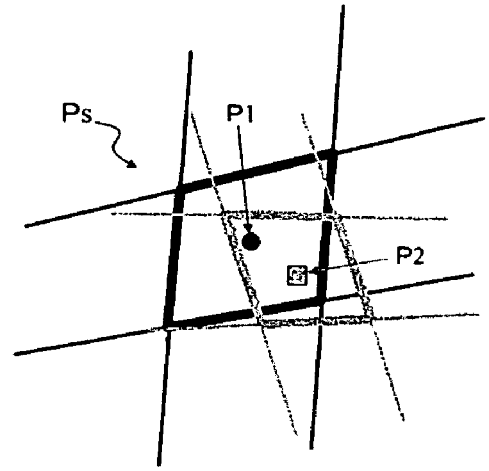
FIGS. 19A, 19B, and 19C are enlarged views in the vicinity of a given screen coordinate Ps shown in FIG. 18.
Figure 19B:
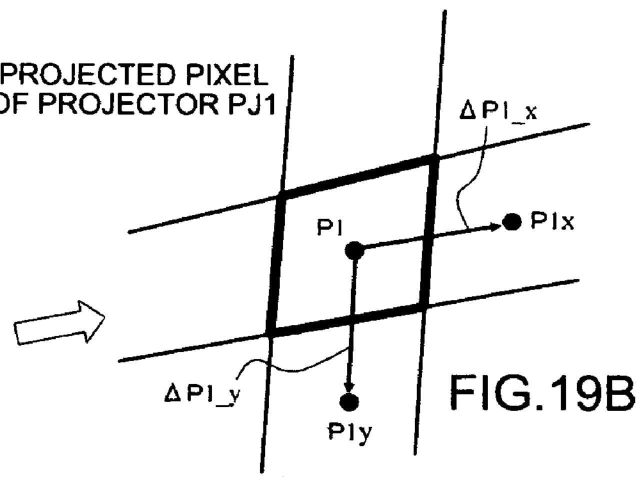
Figure 19C:
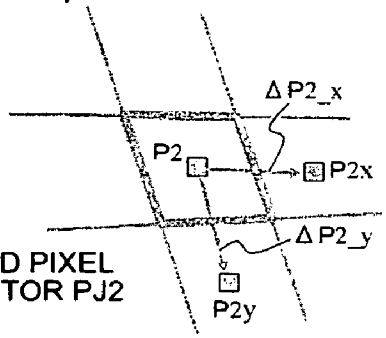
Figure 20:
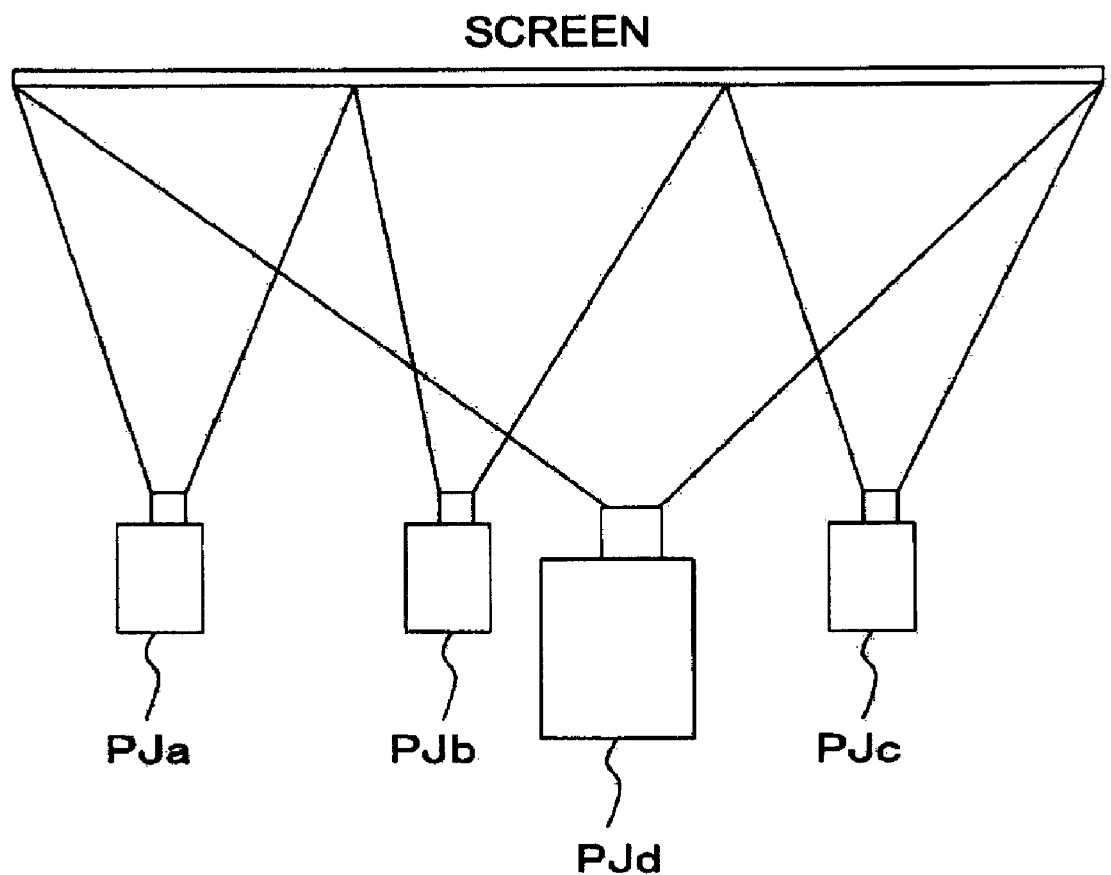
FIG. 20 is a view schematically showing the configuration of a multi-screen display apparatus in the related art.

FIGS. 19A, 19B, and 19C are enlarged views in the vicinity of the screen coordinate Ps on the screen SCR. As can be understood from FIG. 19A, there is a superimposed portion of the pixels (indicated by thick frames) of the respective projectors PJ1 and PJ2 in a portion at the screen coordinate Ps.

Herein, let us consider differential vectors (in this case, differential vectors from the center to the center of the respective pixels) on the screen for the pixel in the x direction (referred to as the pixel P1x) adjacent to the pixel (referred to as the pixel P1) at the projector coordinate P1 and the pixel in the y direction (referred to as the pixel P1y) adjacent to the pixel P1 on the projector PJ1 side, and differential vectors (also, differential vectors from the center to the center of the respective pixels) on the screen for the pixel in the x direction (referred to as the pixel P2x) adjacent to the pixel P2 and the pixel in the y direction (referred to as the pixel P2y) adjacent to the pixel P2 on the projector PJ2 side.

As is shown in FIG. 19B, let ΔP1_x be the differential vector in the x direction on the screen SCR of the projector PJ1, then ΔP1_x can be expressed as: ΔP1_x=P1x−P1. Also, let ΔP1_y be the differential vector in the y direction, then ΔP1_y can be expressed as: ΔP1_y=P1y−P1.

Likewise, as is shown in FIG. 19C, let ΔP2_x be the differential vector in the x direction on the screen SCR of the projector PJ2, then ΔP2_x can be expressed as: ΔP2_x=P2x−P2. Also, let ΔP2_y be the differential vector in the y direction, then ΔP2_y can be expressed as: ΔP2_y=P2y−P2.

When the differential vectors ΔP1_x and ΔP1_y of the pixel P1x and the pixel P1y adjacent to the pixel P1, respectively, in the x direction and the y direction on the projector PJ1 side, and the differential vectors ΔP2_x and ΔP2_y of the pixel P2x and the pixel P2y adjacent to the pixel P2, respectively, in the x direction and the y direction on the projector PJ2 side, are considered, the projectors PJ1 and PJ2 are disposed with respect to the screen SCR in such a manner that the differential vectors ΔP1_x and ΔP2_x are different and the differential vectors ΔP1_y and ΔP2_y are also different.

By disposing the projectors PJ1 and PJ2 in this manner, pixels of various sizes at various luminance values can be aligned on the screen SCR in the form other than a tetragonal lattice. It is thus possible to vary the size and the luminance value of pixels and the periodic arrangement of pixels in the superimposed portion. In addition, it is possible to dispose the projectors in a manner so as to suppress the occurrence of moiré regardless of the original shape of projection of the projector.

In this case, too, a ratio of the maximum value and the minimum value of the maximum luminance on the screen of the respective pixels of the respective projectors PJ1 and PJ2 is preferably such that the maximum value of luminance is twice or larger the minimum value of luminance. In addition, it is preferable that the maximum value of the projection area on the screen of the respective pixels of the respective projectors PJ1 and PJ2 is nearly twice or larger the minimum value.

The suppressing effect of moiré is large by disposing the projectors PJ1 and PJ2 with respect to the screen SCR in such a manner that the differential vectors $\Delta P1\_x$ and $\Delta P2\_x$ are different and the differential vectors $\Delta P1\_y$ and $\Delta P2\_y$ are also different. However, the projectors PJ1 and PJ2 may be disposed in such a manner that only the differential vectors $\Delta P1\_x$ and $\Delta P2\_x$ are different, or only the differential vectors $\Delta P1\_y$ and $\Delta P2\_y$ are different.

A processing program to implement the invention described above may be created, and the program may be recorded in a recording medium, such as a floppy disc, an optical disc, and a hard disc. The invention therefore can include a recording medium having recorded the processing program. Alternatively, the processing program may be downloaded via a network.

While this invention has been described in conjunction with the specific embodiments thereof, it is evident that many alternatives, modifications, and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. A display apparatus that displays one image plane using plural projection type image display devices, wherein:

the plural projection type image display devices that together form the display apparatus are disposed in such a manner that at most one projection type image display device among the plural projection type image display devices forms a projection region of an original shape of projection on a screen;

the plural projection type image display devices are disposed in such a manner that a ratio between a maximum value and a minimum value of maximum luminance on the screen of each pixel of a projected image from each projection type image display device is a predetermined value or larger; and the ratio between the maximum value and the minimum value of the maximum luminance of each pixel is such that a maximum value of luminance is nearly twice or larger a minimum value of luminance.

2. The display apparatus according to claim 1, wherein:

the original shape of projection of each projection type image display device is a rectangular shape, and the plural projection type image display devices are disposed in such a manner that at most one projection type image display device forms a projection region of a rectangular shape.

3. The display apparatus according to claim 1, wherein:

the plural projection type image display devices are disposed in such a manner that a ratio between a maximum value and a minimum value of a projection area on the screen by pixels of each projection type image display device is a specific value or larger.

4. A display apparatus that displays one image plane using plural projection type image display devices, wherein:

the plural projection type image display devices that together form the display apparatus are disposed in such a manner that at most one projection type image display device among the plural projection type image display devices forms a projection region of an original shape of projection on a screen;

the plural projection type image display devices are disposed in such a manner that a ratio between a maximum value and a minimum value of a projection area on the screen by pixels of each projection type image display device is a specific value or larger; and a ratio between the maximum value and the minimum value of the projection area on the screen of the pixels of each projection type image display device is such that the maximum value of the projection area is nearly twice or larger the minimum value of the projection area.

5. A display apparatus that displays one image plane on a screen using at least first and second projection type image display devices, wherein:

let P1 be a pixel of the first projection type image display device corresponding to a position at a particular screen coordinate Ps included in a superimposed region in which projection regions formed on the screen by the first and second projection type image display devices are superimposed, and let P2 be a pixel of the second projection type image display device corresponding to the position at the screen coordinate Ps;

each projection type image display device is disposed with respect to the screen in such a manner that a differential vector on the screen, $DP1=(P1'-P1)$, between the pixel P1 of the first projection type image display device and at least one pixel P1' adjacent to the pixel P1 is different from a differential vector on the screen, $DP2=(P2'-P2)$, between the pixel P2 of the second projection type image display device and a pixel P2' adjacent to the pixel P2;

the at least first and second projection type image display devices are disposed in such a manner that a ratio between a maximum value and a minimum value of maximum luminance on the screen of each pixel of a projected image from each projection type image display device is a predetermined value or larger;

the ratio between the maximum value and the minimum value of the maximum luminance of each pixel is such that a maximum value of luminance is nearly twice or larger a minimum value of luminance.

6. An image information generating method adapted to a display apparatus for generating image information given to respective projection type image display devices that together form the display apparatus that displays one image plane using plural projection type image display devices, the method comprising:

generating plural sub-regions by dividing the screen;

acquiring resolution of each projection type image display for each one of the sub-regions obtained by dividing the screen; and allocating a pixel value to a pixel of each projection type image display device corresponding to a sub-region of interest, first from a projection type image display device judged as having lowest resolution for the sub-region of interest.

7. The image information generating method according to claim 6, wherein:

when the pixel value is allocated, a given pixel value that is equal to or smaller than a pixel value of a pixel having a minimum pixel value among desired pixel values that should be displayed on the screen by pixels within the sub-region of interest is first given to each pixel corresponding to the sub-region of interest of the projection type image display device judged as having the lowest resolution for the sub-region of interest, and a difference between the pixel value given from the projection type image display device judged as having the lowest resolution and the desired pixel value is given to each pixel corresponding to the sub-region of interest of another projection type image display device.

8. The image information generating method according to claim 6, wherein:

the pixel value is a luminance value.

* * * * *